US006352396B1

(12) United States Patent

Budd et al.

(10) Patent No.: US 6,352,396 B1

(45) Date of Patent: Mar. 5, 2002

(54) AUTOMATIC WHEELCHAIR RESTRAINING DEVICE

(75) Inventors: Alfred Lewis Budd, Winamac; Jeffrey J. Hermanson, Culver, both of IN (US)

(73) Assignee: The Braun Corporation, Winamac, IN (US)

(*) Notice: Subject to any disclaimer, the term of this patent is extended or adjusted under 35 U.S.C. 154(b) by 0 days.

(21) Appl. No.: 09/550,481

(22) Filed: Apr. 14, 2000

Related U.S. Application Data

(60) Provisional application No. 60/129,588, filed on Apr. 16, 1999.

(51) Int. Cl.[7] .................................................. B60P 7/08

(52) U.S. Cl. ...................... 410/8; 410/4; 410/7; 410/80

(58) Field of Search ............................... 410/3, 4, 7, 8, 410/9, 19, 22, 80; 296/65.04; 248/503.1; 297/DIG. 4; 280/304.1

(56) References Cited

U.S. PATENT DOCUMENTS 4,083,594 A 4/1978 Tullock
4,093,303 A 6/1978 Nelson
4,113,270 A 9/1978 Barecki
4,221,396 A 9/1980 Kehl
4,369,995 A 1/1983 Harder, Jr.
4,475,762 A 10/1984 DeLong et al.
4,492,403 A 1/1985 Blomgren et al.
4,511,171 A 4/1985 Petersen
4,520,893 A 6/1985 Keough
4,588,340 A * 5/1986 Howard ......................... 410/7
4,623,289 A 11/1986 Apostolos ...................... 410/7
4,671,713 A * 6/1987 Leukman ....................... 410/7
4,690,364 A 9/1987 Constantin
4,730,964 A 3/1988 Joyner ......................... 410/23
4,805,954 A 2/1989 Lazaroff
4,877,260 A 10/1989 Howland
4,973,022 A 11/1990 Mayland
4,974,905 A 12/1990 Davis
4,995,775 A 2/1991 Gresham ..................... 410/10
5,092,722 A * 3/1992 Reazer, III et al. ......... 410/104
5,186,585 A 2/1993 Sousa et al. .................... 410/9
5,344,265 A 9/1994 Ullman et al. ................. 410/3
5,388,937 A 2/1995 Farsai ........................... 410/9
5,489,170 A 2/1996 Inoue et al. ................... 410/7
5,567,095 A * 10/1996 James et al. ................... 410/7
5,628,595 A 5/1997 Harris ........................... 410/7
5,713,704 A 2/1998 Pommier et al. .............. 410/9
5,746,554 A * 5/1998 Boydstun, IV et al. ..... 410/7 X
5,794,908 A 8/1998 East et al.
5,795,115 A 8/1998 Collins ........................ 410/22
5,810,542 A 9/1998 Ostrander
5,888,038 A 3/1999 Ditch et al. .................... 410/7
5,913,559 A * 6/1999 Sexton et al. ............... 410/7 X
6,113,325 A * 9/2000 Craft ............................. 410/7
6,149,359 A * 11/2000 Cardona ...................... 410/11
6,171,035 B1 * 1/2001 McLaurin et al. ............. 410/7
6,231,283 B1 * 5/2001 Stowers ......................... 410/9

* cited by examiner

*Primary Examiner*—Stephen T. Gordon

(74) *Attorney, Agent, or Firm*—Woodard, Emhard, Naughton, Moriarty & McNett

(57) ABSTRACT

The present invention relates to a mechanism for moving a vehicular wheelchair restraining device back and forth between a remote, stowed position and a deployed position from which it may lockingly engage a wheelchair to prevent it from freely moving around the vehicle. The mechanism includes a shallow platform having ramped sides over which a wheelchair may easily roll, and a motor and drive train for moving the wheelchair restraining mechanism between its remote position and its deployed position.

7 Claims, 11 Drawing Sheets

AUTOMATIC WHEELCHAIR RESTRAINING DEVICE

CROSS-REFERENCE TO RELATED APPLICATIONS

This application claims priority to U.S. Provisional Application Serial No. 60/129,588 filed Apr. 16, 1999.

TECHNICAL FIELD OF THE INVENTION

The present invention relates generally to durable medical equipment and, more particularly, to a mechanism for moving a vehicular wheelchair-restraining device back and forth from a stowed position in a vehicle to an engaged position capable of securing a wheelchair to the floor of the vehicle.

BACKGROUND OF THE INVENTION

Mechanisms for securing a wheelchair to the floor of a vehicle are known in the art. See, for example, U.S. Pat. No. 4,690,364 to Constantin, the disclosure of which is incorporated herein by reference in its entirety. The wheelchair restraint of the '364 patent is capable of coupling a wheelchair to the floor of a motor vehicle, while still allowing the wheelchair 360 degrees rotational freedom. A commercially available prior art device capable of so coupling a wheelchair to the floor of a motor vehicle is shown in FIGS. 1 and 2. As shown in FIG. 1, the prior art wheelchair restraint 1' includes a housing 2' with flanges 3' for bolting the restraint 1' to a vehicle floor. FIG. 2 illustrates the interior workings of the prior art wheelchair restraint 1', including a solenoid 4' for actuating the release of the locking members 5' and 6'. As disclosed in U.S. Pat. No. 4,690,364, locking members 5' and 6' are adapted to rotate open upon pressure from an advancing engaging member (not shown) connected to a wheelchair. A spring 7' is provided to assist in the smooth motion of locking members 5' and 6'. Other similar devices are known which likewise secure a wheelchair to the floor of a vehicle.

One disadvantage shared by prior art wheelchair lockdown devices is that they are permanently fastened to the vehicle floor, making it difficult for a wheelchair passenger or attendant to maneuver a wheelchair around them upon entry and/or egress of the vehicle. The stationary nature of the known prior art devices also makes it difficult to quickly adapt the vehicle for use by others not requiring a wheelchair.

Another disadvantage of prior art vehicular-mounted wheelchair restraining devices is that they are designed to be approached from the rear interior of the vehicle (i.e. the wheelchair is presumed to enter the vehicle from a rear or side rear door.) When such a device is used to anchor a wheelchair at the driver's position, the restraining device is in the way of a wheelchair passenger entering the vehicle from the driver's side door via a lift or other means, restricting vehicular ingress/egress. The wheelchair passenger must either run his chair over the restraining device or face the difficult task of navigating around the restraining device in very tight quarters.

Yet another disadvantage common to many of the prior art vehicular wheelchair restraining devices is that they present a traffic obstacle to passengers entering and exiting the vehicle by wheelchair or by foot. The prior art devices are bulky and are located directly in the path of passenger traffic. People entering and/or exiting the vehicle on foot may be slowed while navigating around the prior art devices, while people entering and/or exiting by wheelchair run the risk of getting their wheelchairs hung up on the prior art devices.

There is therefore a need for a wheelchair restraining device that may be stored out of the way of foot and wheelchair traffic during the loading and unloading of the vehicle and selectively deployed into operating position when a wheelchair passenger is aboard the vehicle and desires to lock down his wheelchair. The present invention is directed toward meeting this need.

SUMMARY OF THE INVENTION

One embodiment of the present invention relates to an unobtrusive mechanism for moving a wheelchair restraining device back and forth from a recessed, stored position near the firewall of a passenger vehicle to a deployed position wherein the wheelchair restraining device may engage a wheelchair and prevent it from engaging in uncontrolled movement about the vehicle.

DETAILED DESCRIPTION OF THE PREFERRED EMBODIMENT

Figure 1:
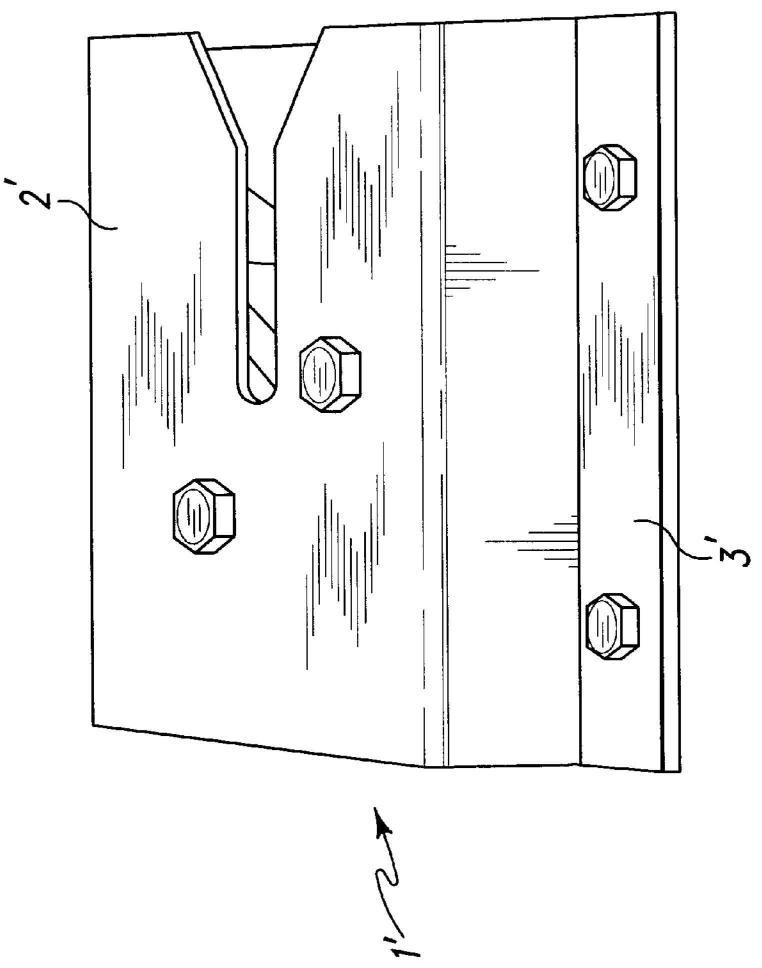
Fig. 1 (PRIOR ART)
FIG. 1 is a perspective view of a prior art wheelchair restraining apparatus.
Figure 2:
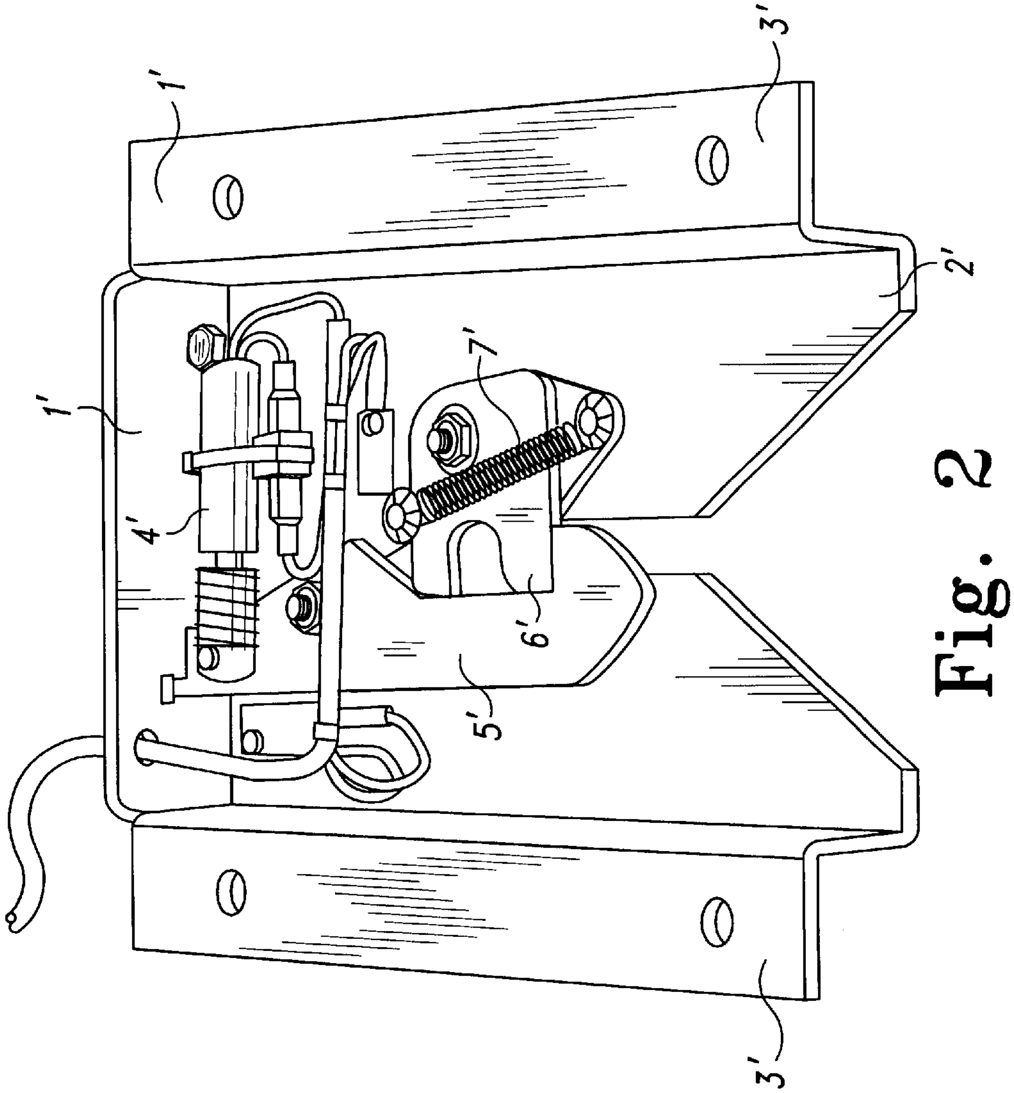
Fig. 2 (PRIOR ART)
FIG. 2 is a perspective view of the interior of the apparatus of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
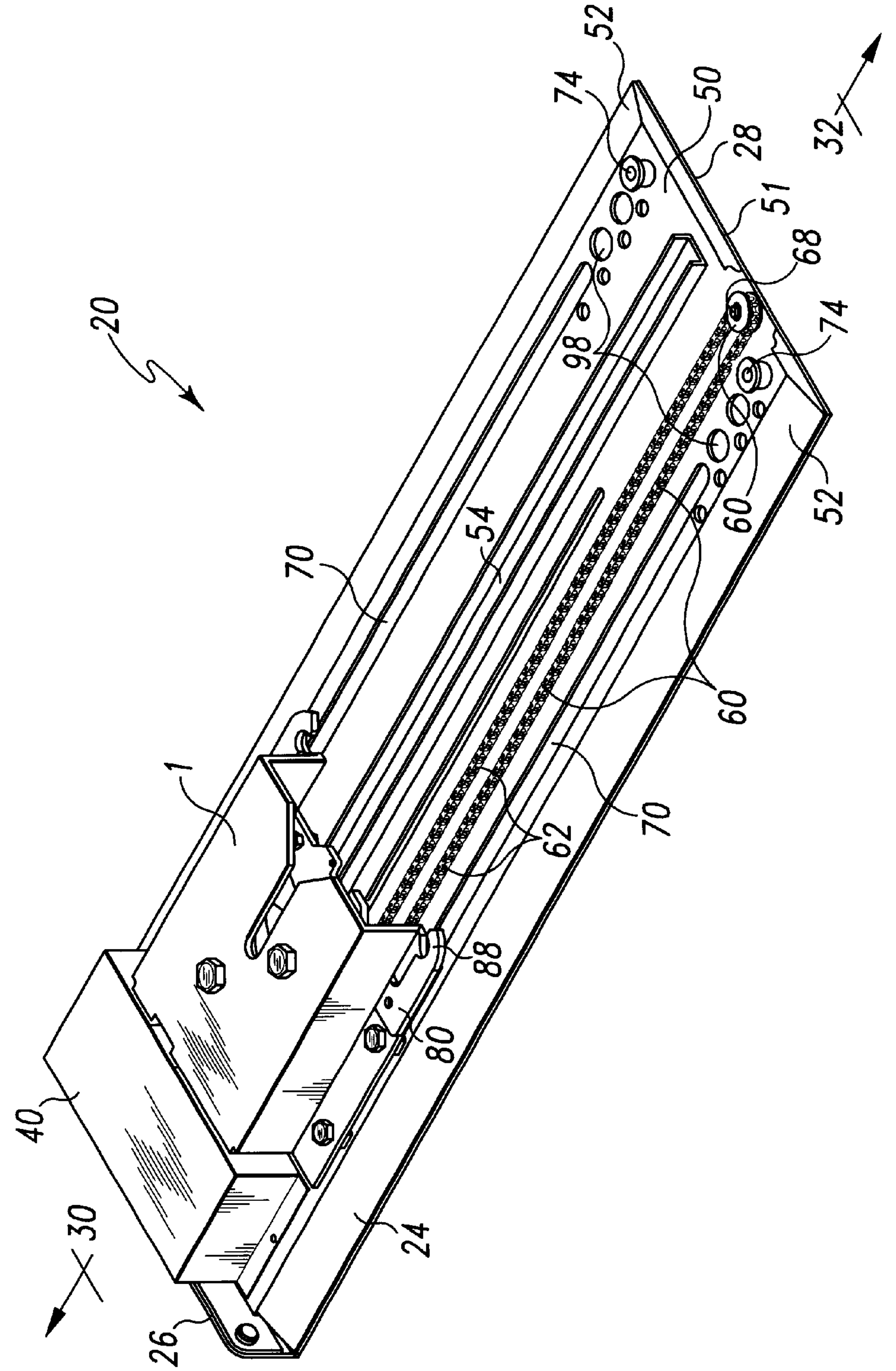
FIG. 3 is a first perspective view of a first embodiment of the present invention.
Figure 4:
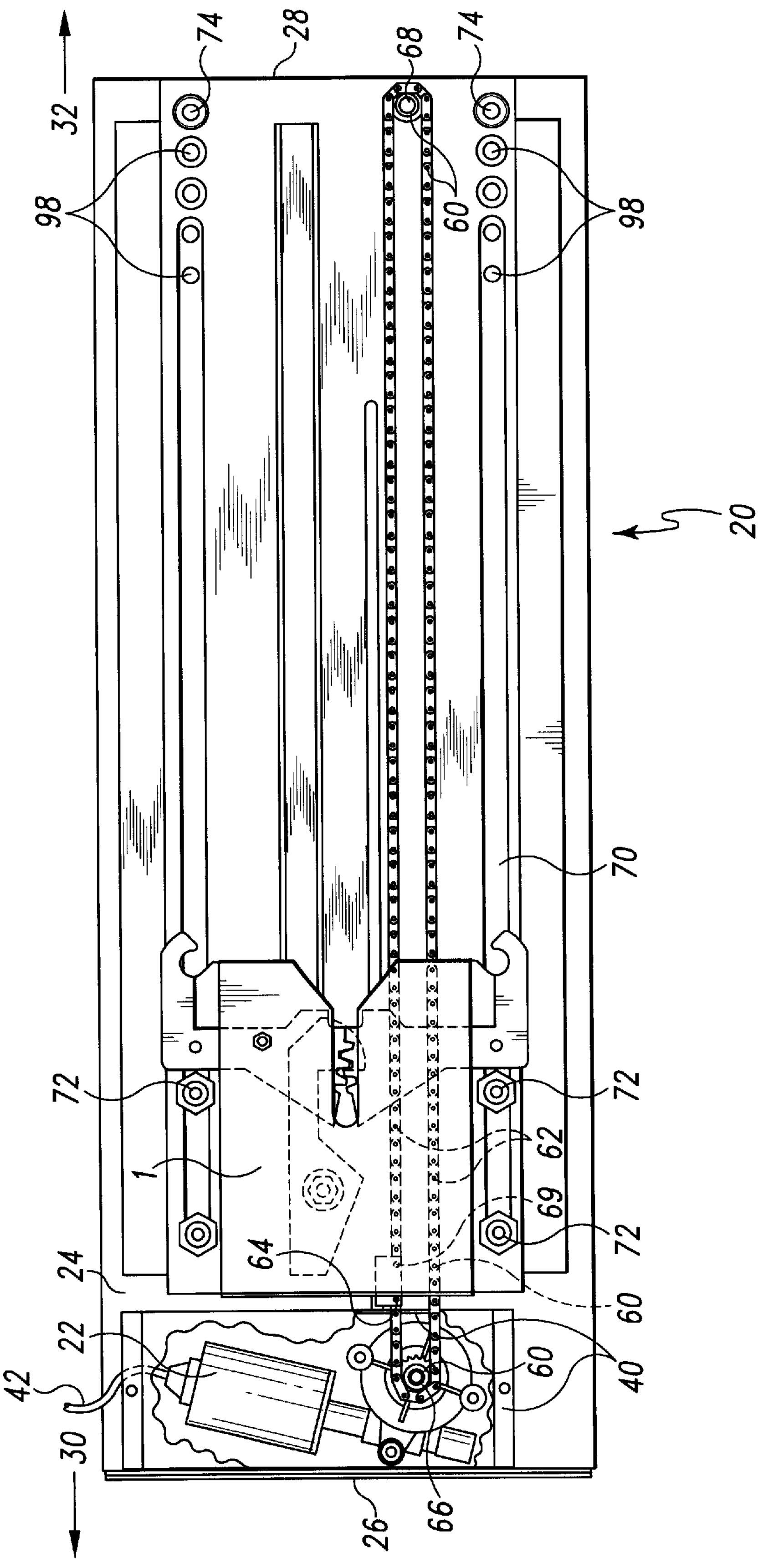
FIG. 4 is a top plan view of the embodiment of FIG. 3.
Figure 11:
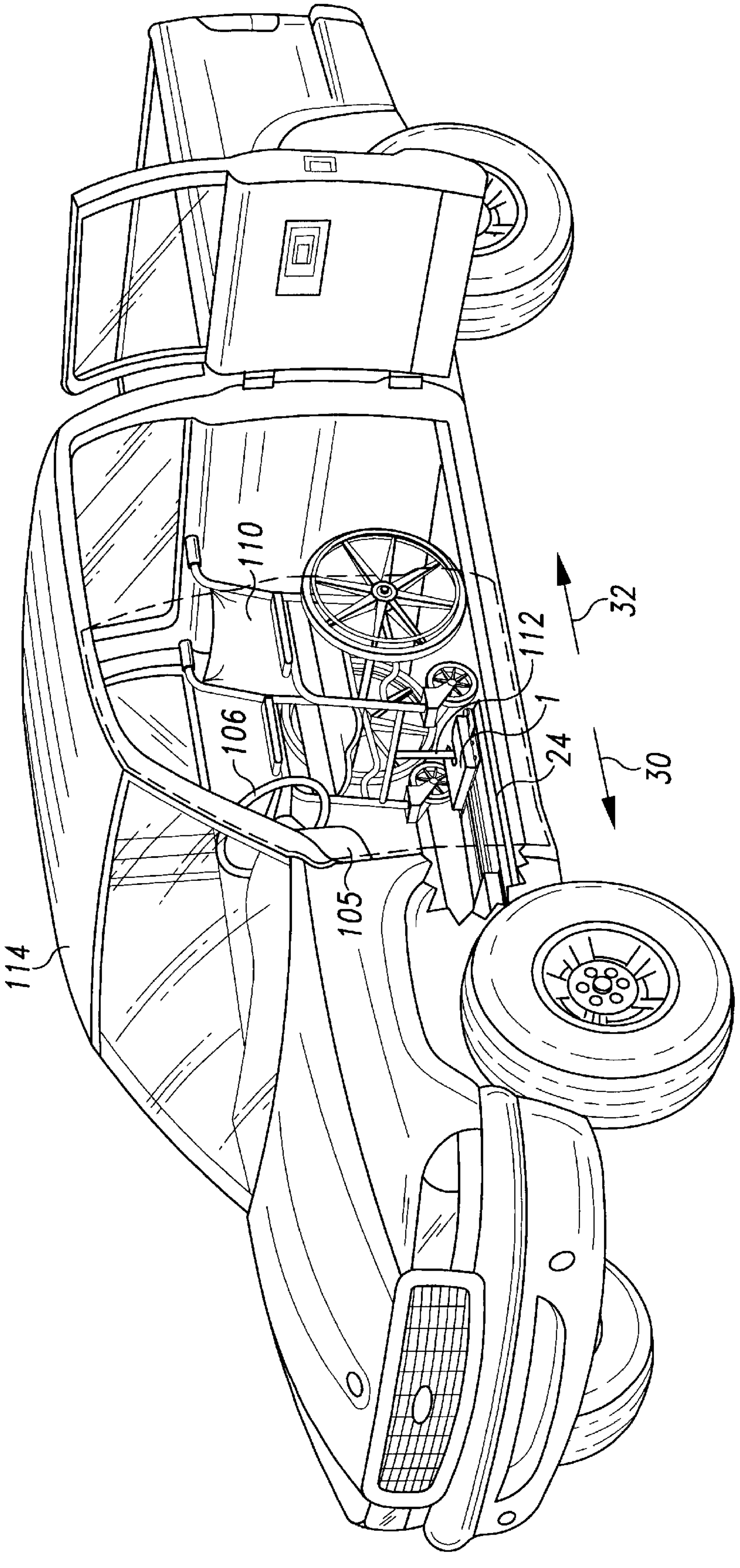
FIG. 11 is a perspective view of the embodiment of FIG. 3 in use with a wheelchair.

FIGS. 3 and 4 illustrate one embodiment of an automatic wheelchair-restraining device 20 for use in a passenger vehicle. A motor 22 is coupled to a platform member 24 and connected to a wheelchair lockdown apparatus 1. Platform member 24 extends lengthwise from a distal stowage end 26 to a proximal deployed end 28. As best shown in FIG. 11, stowage end 26 is preferably recessed adjacent or near a vehicle's firewall, and is more preferably located under the vehicle's dash 105. Deployed end 28 may be located anywhere in the vehicle where there is enough floor space to accommodate a wheelchair 110, preferably beneath/behind the steering wheel 106.

Figure 5:
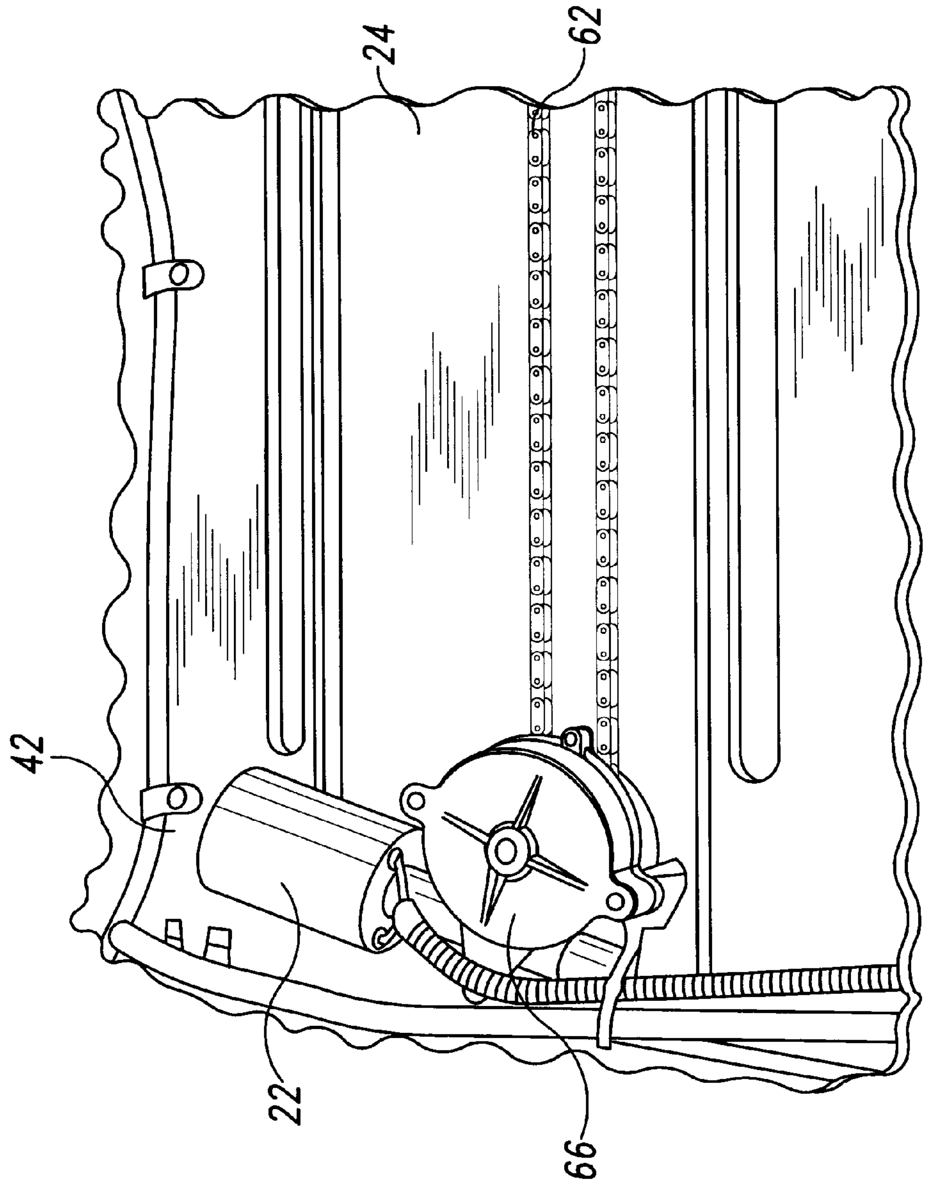
FIG. 5 is a first partial perspective view of the embodiment of FIG. 3.
Figure 6:
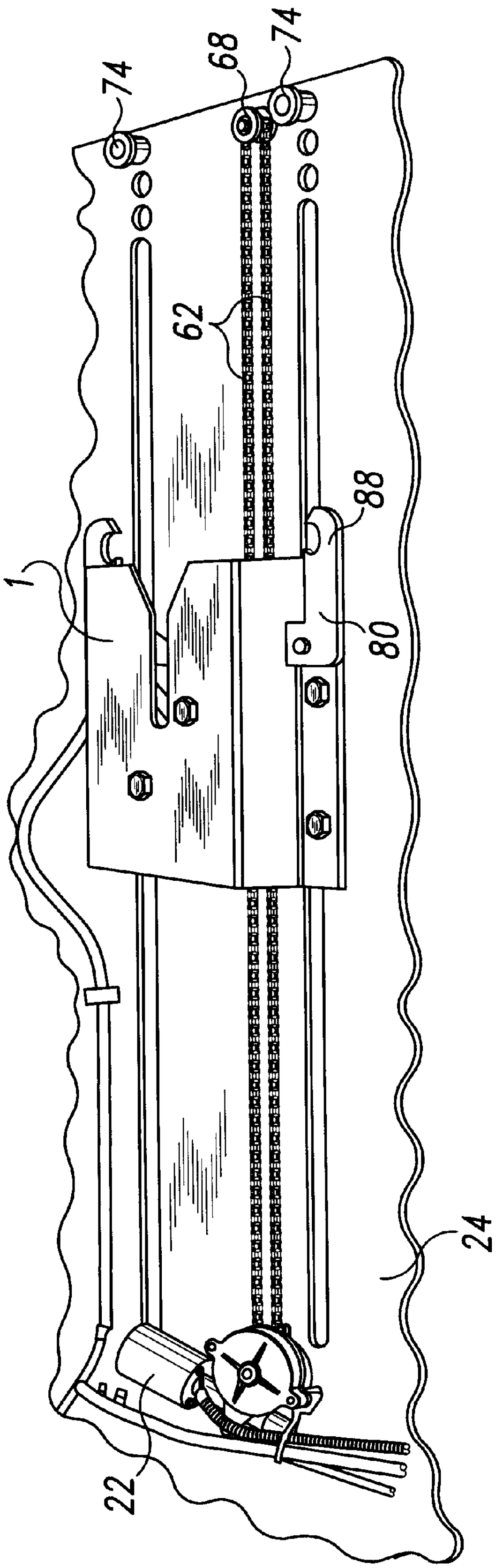
FIG. 6 is a second perspective view of an embodiment of FIG. 3.
Figure 7:
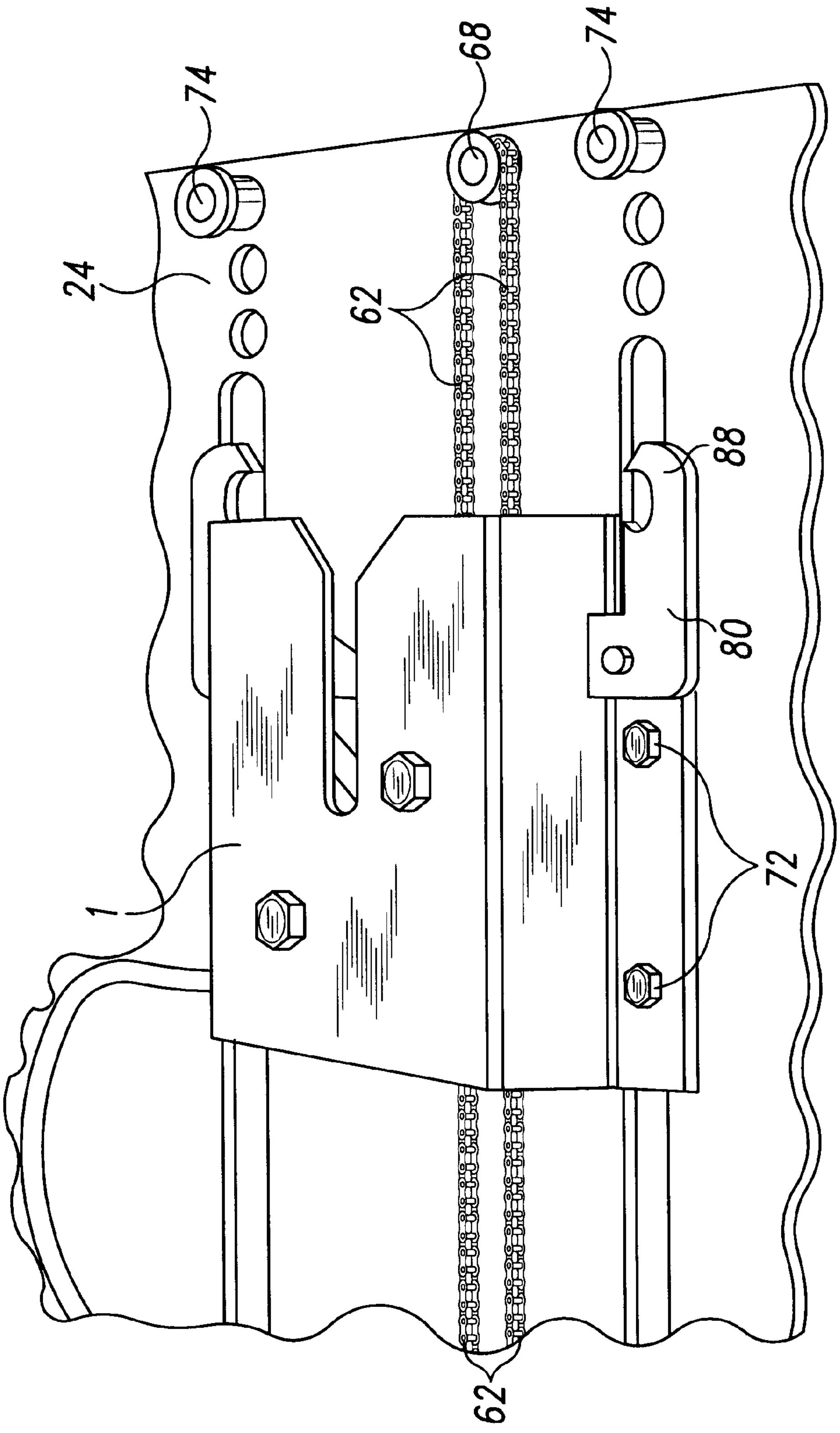
FIG. 7 is a second partial perspective view of the embodiment of FIG. 3.
Figure 8:
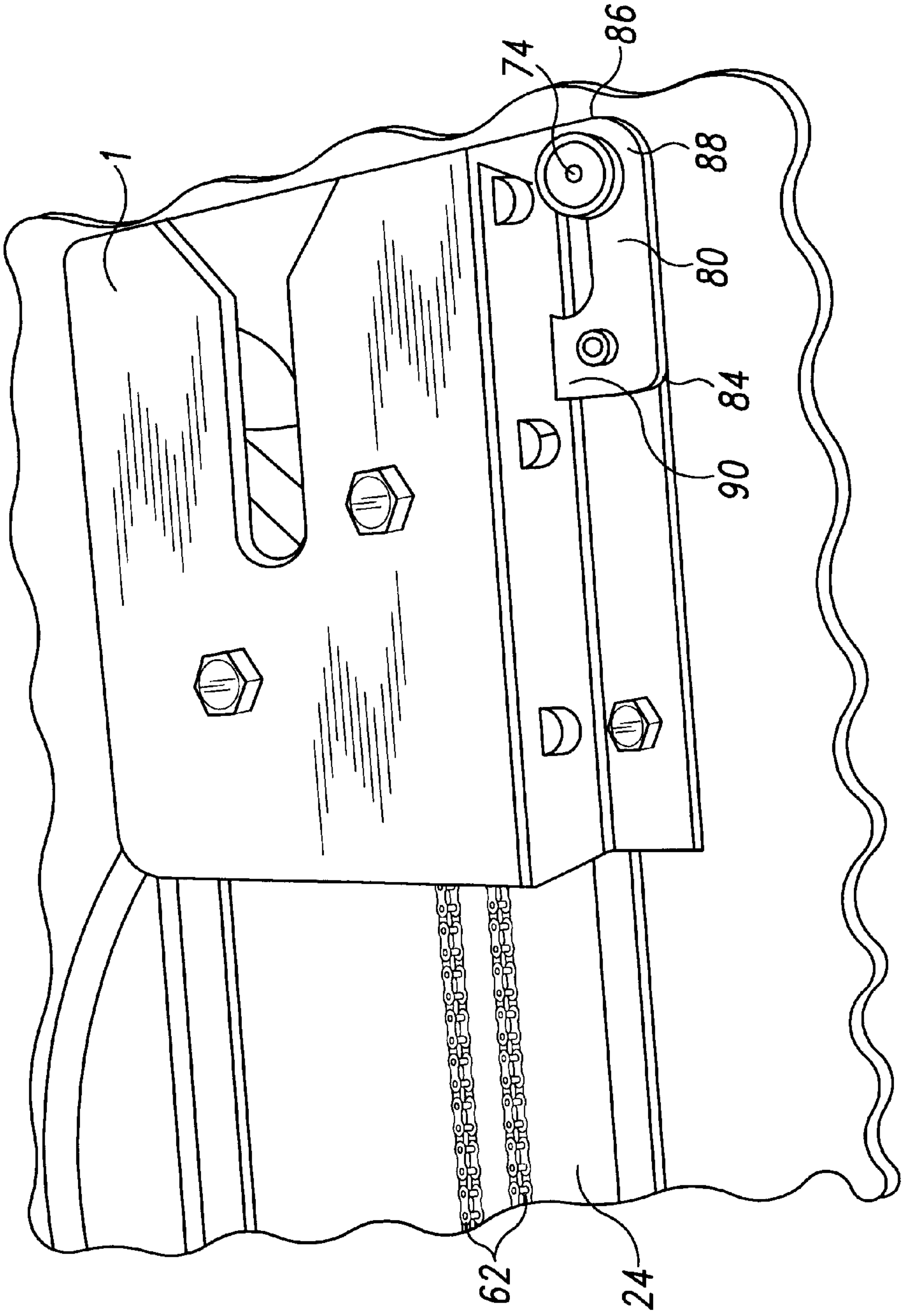
FIG. 8 is a third partial perspective view of the embodiment of FIG. 3.
Figure 9:
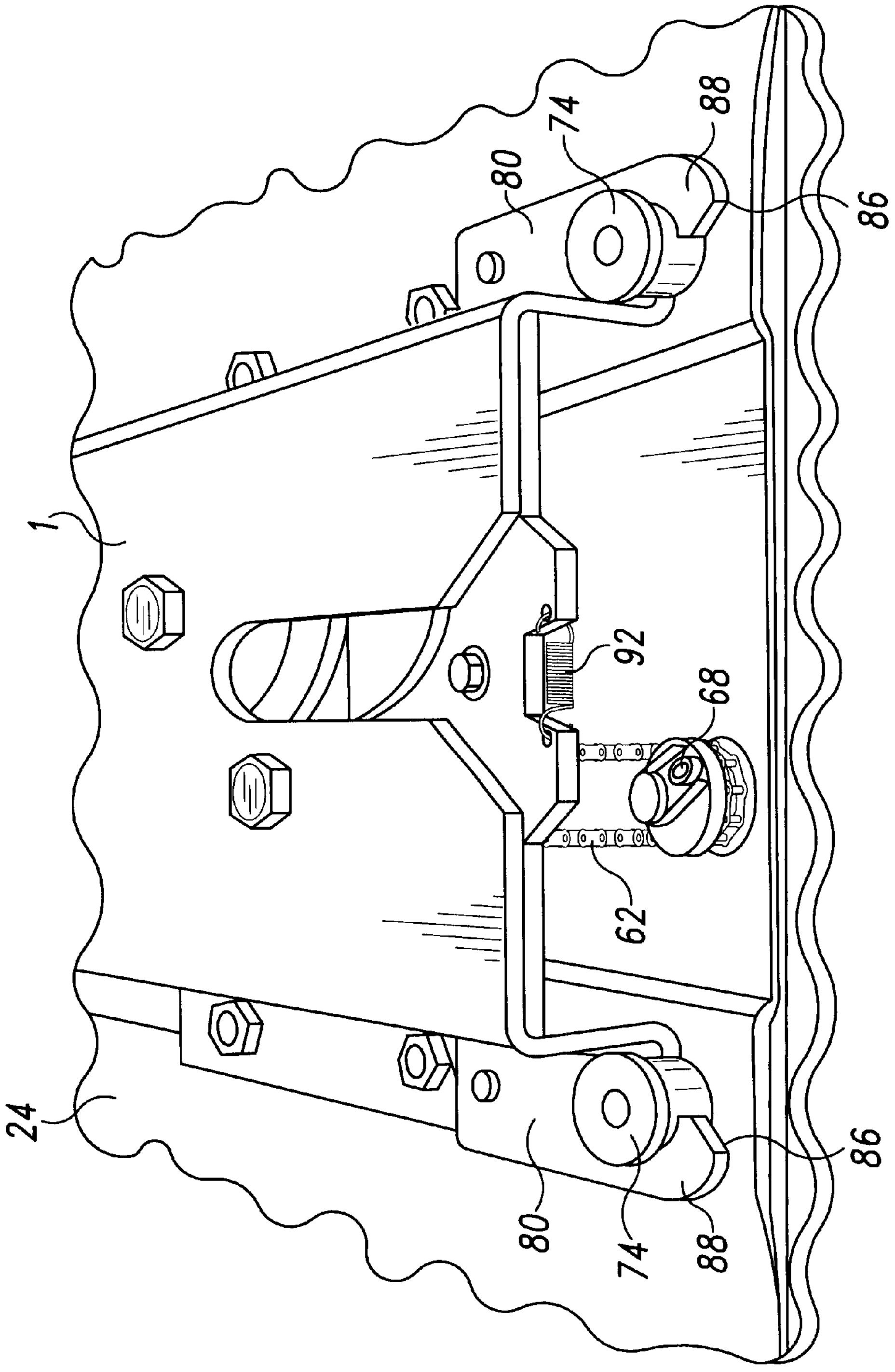
FIG. 9 is a front perspective view of the embodiment of FIG. 3.

Wheelchair lockdown apparatus 1 may be any convenient wheelchair securing device known in the art, such as one embodiment of the '364 patent commercially marketed as EZ LOCK (and modified as described hereinbelow). Lockdown apparatus 1 is slidingly coupled to platform member 24. Included as part of wheelchair lockdown apparatus 1 is a straight member 112 extending down from the wheelchair 110 and adapted to lockingly engage wheelchair lockdown apparatus Referring once again to FIGS. 3 and 4, motor 22 may be any convenient motor capable of pulling wheelchair lockdown apparatus 1 along platform member 24, such as a typical vehicular power window motor. Motor 22 is coupled to platform member 24 and is adapted to move the wheelchair lockdown apparatus 1 back and forth along the length of platform member 24. Preferably, motor 22 is connected adjacent stowage end 26 of platform member 24. Motor 22 is illustrated in a motor housing 40 in FIGS. 3 and 4, and is illustrated without any housing in FIG. 5.

As shown in FIG. 3 and FIGS. 6–8, in operation motor 22 is adapted to pull wheelchair lockdown apparatus 1 from a stowage position 30 near stowage end 26 to a deployed position 32 near the deployed end 28. Likewise, motor 22 is adapted to pull wheelchair lockdown apparatus 1 from the deployed position 32 back to the stowage position 30. The direction the motor 22 pulls is a function of which rotational direction motor 22 is operated. FIG. 3 illustrates wheelchair lockdown apparatus stowed in the stowage position 30 near the distal stowage end 26 of platform member 24, while FIGS. 6–9 illustrate lockdown apparatus 1 progressing towards a deployed position 32 near the proximal deployed end 28 of platform member 24. It should be noted that the deployed position 32 is not a single fixed position, but may be customized as detailed below.

Motor actuator controls (not shown) are operationally coupled to motor 22 by conduits 42 and positioned in the vehicle. These controls are preferably switches connected to motor 22 by wire 42 and may be located at any convenient location in the vehicle. Alternately, a wireless remote system (not shown) comprising a transmitter/sensor pair or the like may be adapted to actuate the motor remotely.

Figure 10:
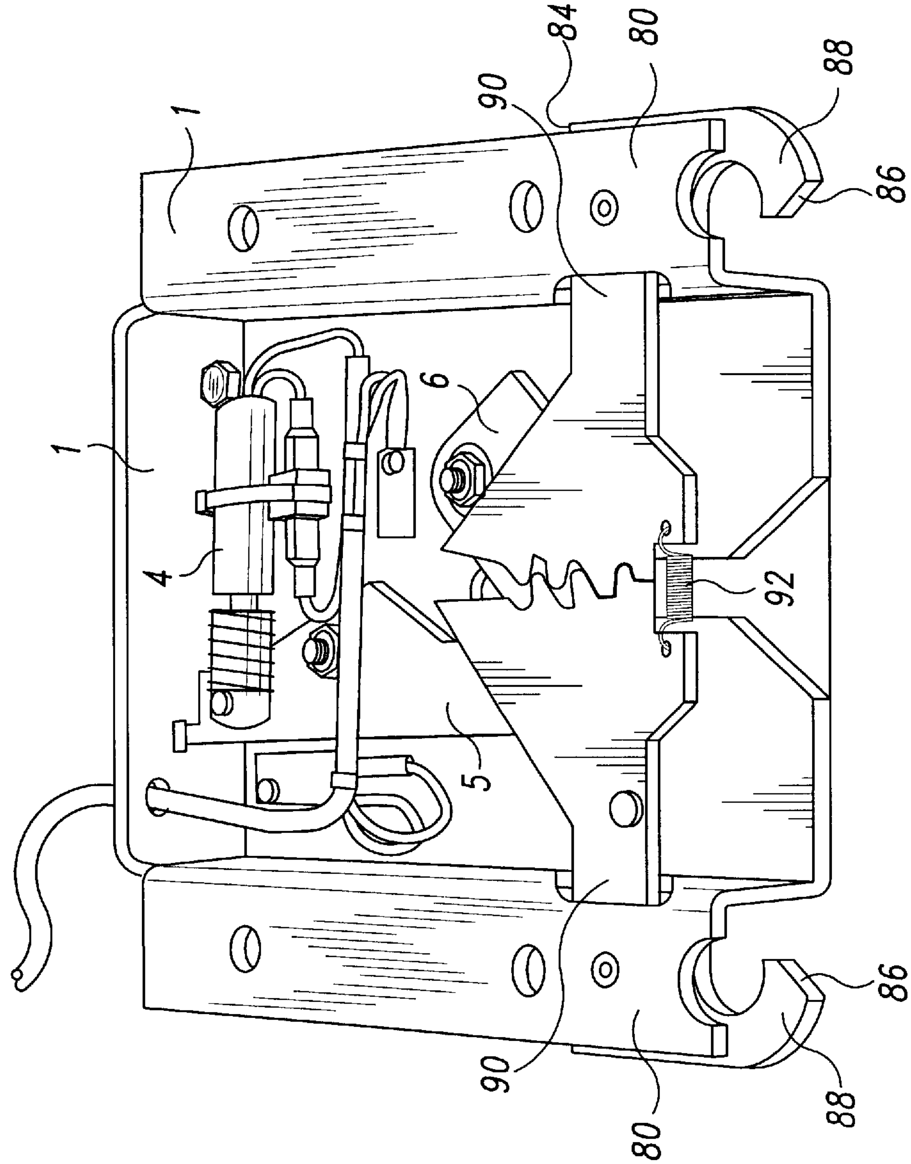
FIG. 10 is a bottom perspective view of the lockdown apparatus portion of the embodiment of FIG. 3.

The motor actuator controls are also operationally coupled to the wheelchair lockdown apparatus 1 (see FIG. 10). When wheelchair lockdown apparatus 1 is disengaged from a wheelchair, the controls are adapted to move the wheelchair lockdown apparatus 1 forward from a recessed stowage position 30 to engage the wheelchair. The controls are further adapted to disengage an engaged wheelchair by first actuating solenoid 4 to release the locking members 5 and 6 from the wheelchair, and then activating motor 22 to pull the wheelchair lockdown apparatus 1 towards the stowed position 30.

As illustrated in FIG. 3, platform member 24 includes a top portion 50, a bottom portion 51, and two oppositely disposed side ramp portions 52. In the preferred embodiment, platform member 24 has a flat top portion 50 and an elongated rectangular shape, although platform member 24 may have any shape convenient to the host vehicle design. Side ramp portions 52 extend from top portion 50 downwardly to the vehicle floor. Top portion 50 of platform member 24 preferably rises about an inch above bottom portion 51, and ramp portions 52 extend far enough outwardly that the angle defined by ramp portion 52 and bottom portion 51 (and the floor) is relatively shallow. Platform member 24 also includes a support member or members 54 adapted to support top portion 50 when foot or wheelchair traffic puts pressure thereon.

Platform member 24 also includes a drive train 60 adapted to move the lockdown apparatus 1 along the track (see FIGS. 3 and 4). In one embodiment, the drive train 60 is a chain drive substantially extending the length of platform member 24 and adapted to move wheelchair lockdown apparatus 1 back and forth along platform member 24. Drive train 60 preferably includes a first long flexible connector 62 having a first end 64 connected to wheelchair lockdown apparatus 1, tractionally engaging a rotatable drive member 66 of motor 22, extending to and frictionally engaging pulley 68, and extending back to connect to wheelchair lockdown apparatus 1 at second end 69. In the preferred embodiment, flexible connector 62 is a chain and rotatable drive member 66 is a gear adapted to meshingly engage the chain. In other contemplated embodiments, other convenient combinations of drive elements, such as a belt and friction wheel, may be chosen as flexible connector 60 and rotatable drive member 66. Alternately, other linear positioning devices, such as a lead screw, etc., may be used to move lockdown apparatus 1.

In operation, motor 22 turns rotatable drive member 66, which moves the chain 62, thus pulling wheelchair lockdown apparatus 1 along platform member 24. The direction of rotation of rotatable drive member 66 determines the direction of translational motion of wheelchair restraining apparatus 1 along platform member 24.

One embodiment of the present invention includes a longitudinally extending guide track 70 formed in top portion 50 of platform member 24. Guide track 70 is preferentially a slot formed through top portion 50. In the preferred embodiment, a pair of guide tracks 70 are symmetrically formed through top portion 50, and are more preferentially located substantially adjacent respective ramp portions 52. Fasteners 72 extend through guide track 70 and lockingly engage wheelchair-restraining apparatus 1. Fasteners 72 are adapted to extend through each respective slot 70 and slidingly fasten restraining apparatus 1 to top portion 50 of platform member 24. Fasteners 72 may be any convenient slidable fasteners (i.e., nuts and bolts) or may be integrally connected to wheelchair restraining apparatus 1 and formed to slidingly engage guide track(s) 70.

One embodiment of the present invention includes a pair of stopping posts 74 positioned substantially at deployment end 28 of platform member 24. Stopping posts 74 are adapted to stop and lock wheelchair restraining apparatus 1 at a predetermined deployed position along guide track(s) 70, such as at a position placing a wheelchair locked into wheelchair restraining apparatus 1 at a convenient distance from the steering wheel of the vehicle, by engaging wheelchair restraining apparatus 1 to prevent further motion thereof (see discussion of FIGS. 7–10 below).

One embodiment of the present invention includes a manual release override system (not shown) adapted to release the wheelchair in the event of a power failure. Preferably, the manual release system is further adapted to disengage or otherwise operationally release motor 22 from rotatable drive member and allow manual retraction of the wheelchair lockdown apparatus 1 into its stowed position 26. The manual release override system (not shown) is contemplated as including a hand crank or the like to manually actuate drive train 60.

FIGS. 7–10 illustrate one embodiment of the present invention including a pair of engaging members, or "ears", 80 attached to wheelchair restraining apparatus 1. Preferably, there are two ears 80, one ear 80 located symmetrically on either side of restraining apparatus 1. More preferably, ears 80 are positioned substantially above respective guide track 70. Each ear 80 is operationally coupled to a respective locking member 5,6 of restraining apparatus 1 (see FIG. 10). Each ear 80 has a first end 84 and a second end 86. Each ear 80 includes a toothed portion 90 at its respective first end 84. Each ear 80 terminates at respective second end 86 in semicircular recessions 88 formed to accept stopping posts 74. Each toothed portion 90 is adapted to move in unison with a respective locking member 5, 6 such that when locking members 5, 6 rotate to accept a wheelchair member, ears 80 rotate to accept stopping posts 74. Spring 92 biases locking member engaging portions 86 in the closed position. Accordingly, ears 80 lockingly engage respective stopping posts 74 until restraining apparatus 1 releases the wheelchair.

In the embodiment illustrated in FIGS. 3 and 4, pairs of apertures 98 are provided in platform member 24 and are adapted to securely receive stopping posts 74. Stopping posts 74 may be secured by an interference fit into apertures 98, or may be secured by other convenient means such as by matable threads formed respectively on stopping posts 74 and in apertures 98. Apertures 98 are preferably formed in platform member 24 at various symmetrical positions aligned with respective ears 80, such that stopping posts 74 placed in apertures 98 act as short stops, customizing the stopping position of wheelchair restraining apparatus 1, and thus the wheelchair, to the tastes of the operator.

FIG. 11 illustrates the present invention in use with a wheelchair 104. In operation, a wheelchair 110 equipped with a downwardly extending engaging-member 112 can, upon entering the vehicle 114, easily traverse platform member 24. Vehicle 114 is illustrated in FIG. 11 as a four-door crew cab pickup truck, but the present invention may be used with any vehicle allowing wheelchair access. Ramp portions 52 are at a relatively shallow angle with the floor and allow the wheelchair 110 to easily roll up and over platform member 24 with minimal effort.

Once the wheelchair 110 has entered the vehicle 114, it is oriented such that the downwardly extending engaging-member 112 is operationally aligned with wheelchair lockdown apparatus 1. Motor 22 is then engaged (via, for example, actuator controls on the dash 105), driving wheelchair lockdown apparatus 1 towards deployed end 28 until it engages the downwardly extending engaging-member 112. The apparatus 1 continues moving until it engages the stopping posts 74, thereby locking onto engaging-member 112 and securing the engaged wheelchair 110 from unintended motion. When it is so desired, solenoid 4 is actuated via the actuator controls to release the downwardly extending engaging-member 112 from lockdown apparatus 1, and then motor 22 is engaged to pull wheelchair lockdown apparatus 1 into its retracted stowage position 30. Wheelchair 110 may then be rolled over platform 24 for exiting the vehicle 114.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected.

What is claimed is:

1. A wheelchair lockdown device, comprising:

an elongated member having a proximal end, a distal end, a substantially flat top potion, a bottom portion and tapered elongated sides extending from the bottom portion to the top portion;

a motor connected to said elongated member and having a rotatable drive member;

a pulley mounted to said bottom portion of said elongated member substantially near said proximal end;

a slotted guide track formed in said elongated member;

a lockdown apparatus slideably mounted in said slotted guide track and adapted to releasably engage a wheelchair; and a flexible drive connector extending from said lockdown apparatus around said pulley and around said rotatable drive member and back to said lockdown apparatus;

wherein said flexible drive connector tractionally engages said rotatable drive member; and wherein rotation of said rotatable drive member causes movement of said flexible connector and actuates sliding of said lockdown apparatus in said slotted guide track.

2. The device of claim 1, further comprising:

an ear coupled to said lockdown apparatus;

a post connected to said elongated member;

wherein said ear is adapted to engage said post to prevent further motion of said lockdown apparatus.

3. The apparatus of claim 2 wherein said post is adapted to be placed in one of a plurality of discrete positions on said elongated member.

4. The device of claim 1 wherein the lockdown apparatus is adapted to releaseably engage a wheelchair near the proximal end of the elongated member and wherein the motor is adapted to transport the lockdown apparatus to the distal end of the elongated member upon release of a wheelchair.

5. The device of claim 1 wherein the flexible drive connector is a chain.

6. A wheelchair restraining apparatus comprising:

an elongated base having a length;

a motor connected to the base;

a lockdown apparatus operationally connected to the motor and adapted to move along the length of the base;

an ear extending from the lockdown apparatus; and a post extending from the base;

wherein the lockdown apparatus is adapted to automatically engage a wheelchair;

wherein the motor is adapted to actuate movement of the lockdown apparatus along the length of the base; and wherein the post is adapted to engage the ear to stop further motion of the lockdown apparatus relative to the base.

7. A wheelchair lockdown device, comprising:

a base having a proximal end and a distal end;

a guide track formed in the base and substantially extending from the proximal end to the distal end;

a lockdown apparatus slideably mounted in the guide track and adapted to releasably engage a wheelchair; and a motor operationally coupled to the lockdown apparatus;

wherein the motor is adapted to move the lockdown apparatus in the guide track; and wherein the base further comprises a top portion and a bottom portion and oppositely disposed tapered elongated sides extending from the bottom portion to the top portion.

* * * * *